United States Patent [19]

Morlock

[11] 4,134,554
[45] Jan. 16, 1979

[54] GRINDER CYLINDER CONTROL FOR WASTE PAPER GRINDER

[75] Inventor: Ruben D. Morlock, Jamestown, N. Dak.

[73] Assignee: Haybuster Manufacturing, Inc., Jamestown, N. Dak.

[21] Appl. No.: 735,631

[22] Filed: Oct. 26, 1976

[51] Int. Cl.² .......................................... B02C 13/286
[52] U.S. Cl. ................................. 241/35; 241/186 R
[58] Field of Search ..................... 241/33, 34, 35, 73, 241/101.7, 186 R, 186.2, 186.4

[56] References Cited

U.S. PATENT DOCUMENTS

| | | | |
|---|---|---|---|
| 2,650,745 | 9/1953 | Oberwortman | 241/255 |
| 3,743,191 | 7/1973 | Anderson | 241/73 |
| 3,912,175 | 10/1975 | Anderson | 241/73 |
| 3,966,128 | 6/1976 | Anderson et al. | 241/73 |
| 3,967,785 | 7/1976 | Grosch | 241/28 |

*Primary Examiner*—Howard N. Goldberg
*Attorney, Agent, or Firm*—Nickolas E. Westman

[57] ABSTRACT

A feed control grate to control the engagement of waste paper with a grinding cylinder in a tub type waste paper grinder, which can be raised to lift the paper away from the cylinder during start up or when excessive loads are encountered.

6 Claims, 4 Drawing Figures

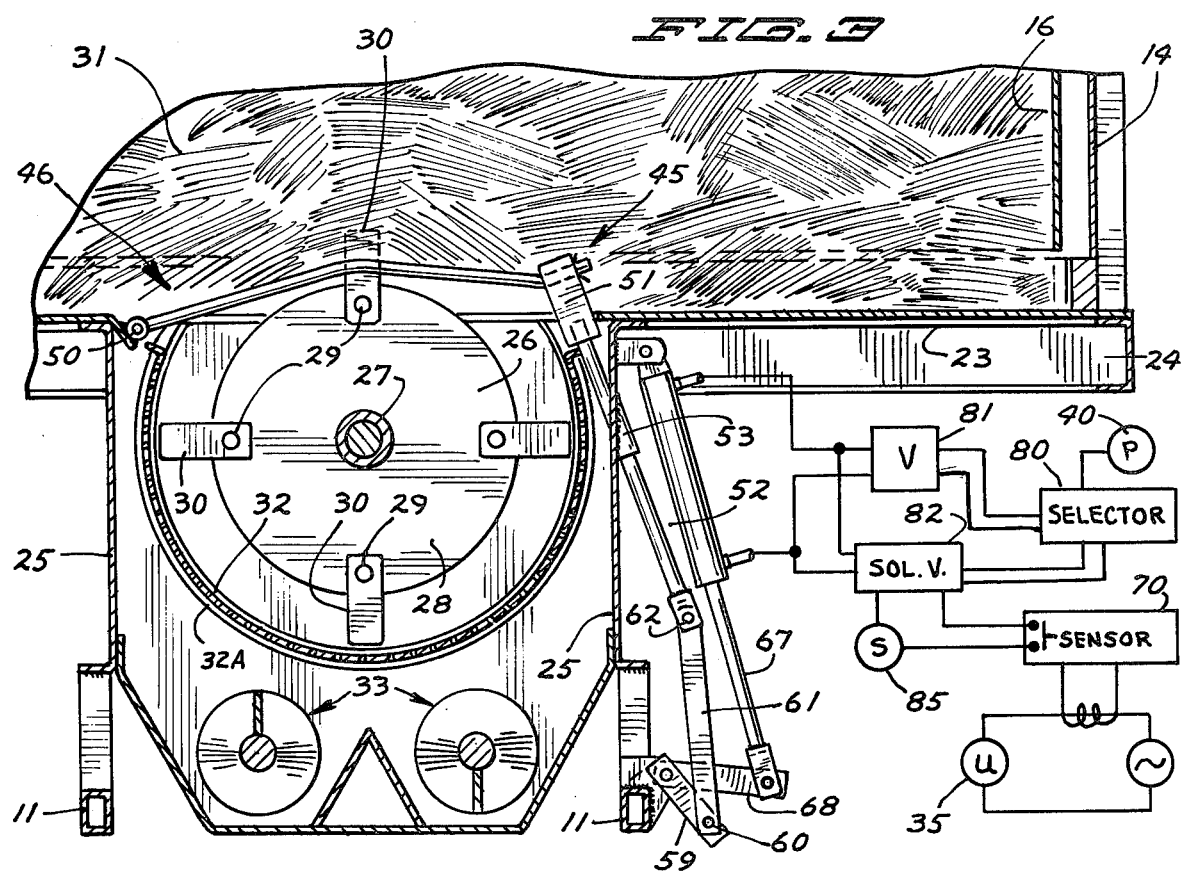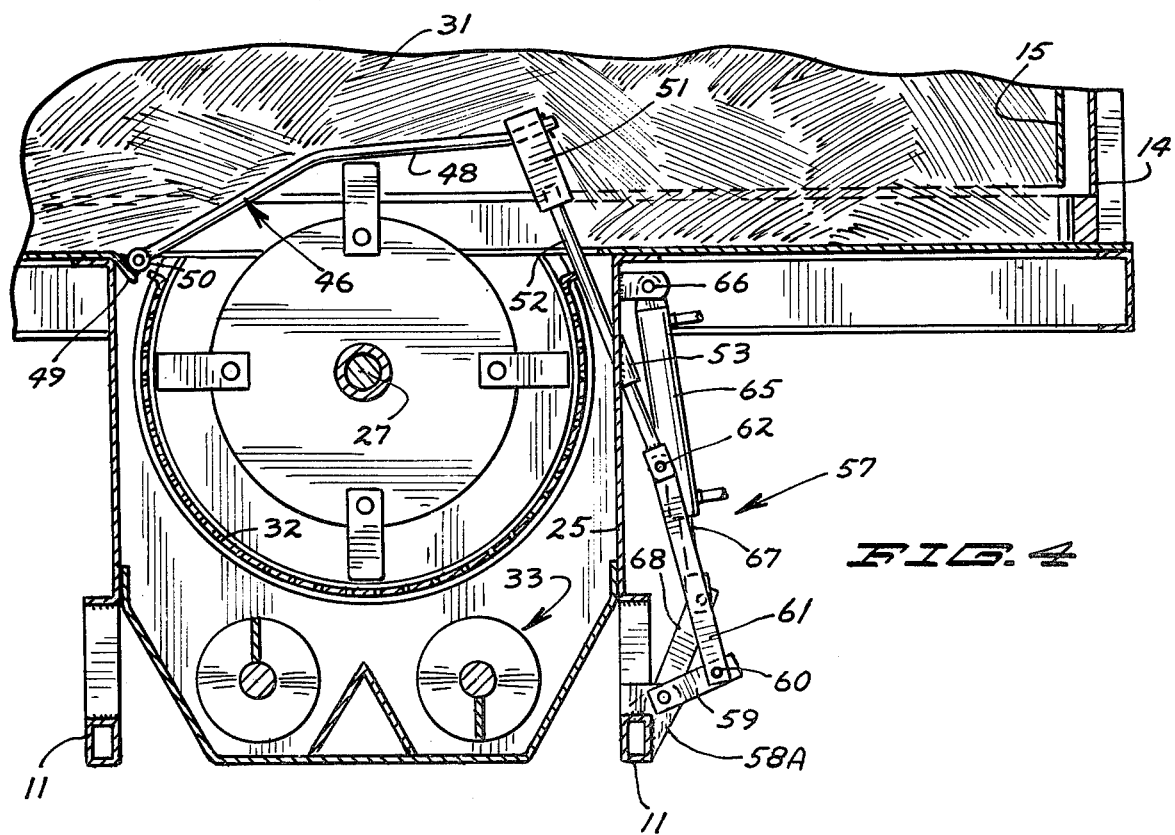

4,134,554

GRINDER CYLINDER CONTROL FOR WASTE PAPER GRINDER

BACKGROUND OF THE INVENTION

1. Field of the Invention

The present invention relates to grinders for grinding waste paper into insulation products, and controls for such grinders.

2. Prior Art

It has been known that loose fill cellulose type insulation can be manufactured from ground up waste paper, and the usage of such loose fill cellulose insulation has been increasing. The insulation is ground from the waste paper, treated with fire retardant chemicals, packaged and then installed in homes with suitable blowers.

Problems in high production grinding have been encountered, and it has been found that with certain changes existing tub type hay grinders can be modified to do an efficient, high volume grinding job for grinding up waste paper. The present device discloses a tub type grinder of the kind generally shown in U.S. Pat. No. 2,650,745 to Oberwortman, which shows a basic configuration of a tub type grinder. The present device also includes additional modifications over U.S. Pat. No. 3,966,128, which illustrates a feeding control for a tub type grinder when used for grinding hay.

In the last mentioned patent, an adjustable plate regulates the feed rate of the hay into a cylinder as the material is moved across the cylinder. In the present device, however, the regulation of the feed is not done in this manner, but the device does provide a grill work for lifting the paper away from the cylinder entirely to permit the cylinder to run free or substantially free during times when the cylinder is tending to load down and slug the machine.

SUMMARY OF THE INVENTION

The present invention relates to a means for controlling the feed of waste paper to a grinding cylinder in a tub type grinder. The grinder is utilized for grinding waste paper into a loose fill cellulose material which is chemically treated and used as insulation material. The initial grinding cylinder takes raw waste paper, such as newspaper and the like and grinds it into a relatively coarse product, which passes through a grinding screen in the normal manner, and is transported for further processing, such as additional grinding and chemical addition to form a finished insulation product.

Waste paper is difficult to grind, and at times because of irregularities in packing and other problems the feed rate is uneven. In the present device, a grate is made so that it will lift the waste paper away from the cylinder for start-up of grinding, or when the loads become great. When used with suitable sensors, to sense the load on the drive motor to the grinder, for example, the waste paper will automatically be lifted off the cylinder until the load is reduced. In this way the problems of plugging the cylinder are minimized substantially and the grinding process is made much more efficient.

BRIEF DESCRIPTION OF THE DRAWINGS

FIG. 3 is a vertical sectional view taken transverse to the axis of the grinding cylinder adjacent the front edge of the grinding cylinder; and FIG. 4 is a sectional view taken along the same line as FIG. 3 showing a feed control member in a raised, nonfeeding position.

DESCRIPTION OF THE PREFERRED EMBODIMENT

Figure 1:
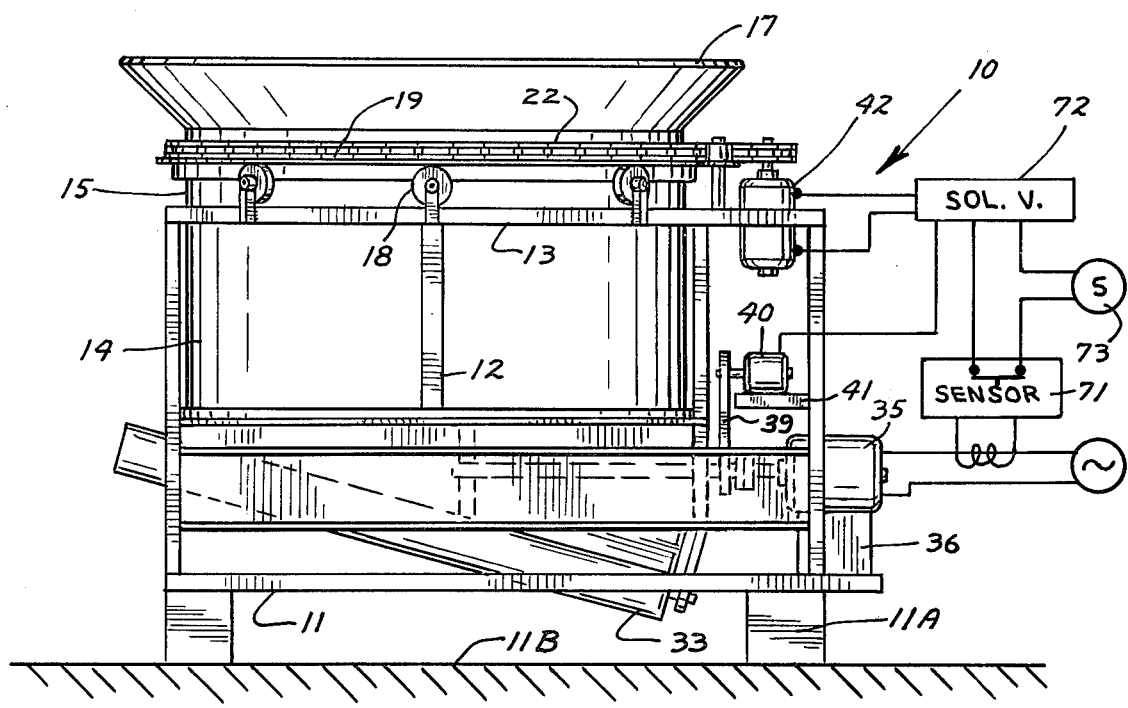
FIG. 1 is a side elevational view of a typical tub type grinder installed on a permanent support for use in grinding waste paper into insulation products.

Referring to FIG. 1, a tub type grinder illustrated generally at 10 is of the type generally shown in U.S. Pat. No. 2,650,745 which is used for grinding forage, and includes the same basic concepts and principles of operation. However, this device is driven from a stationary electric motor, and is mounted on stationary supports rather than on a mobile member. Reference is also made to U.S. Pat. No. 3,966,128 for additional details.

The grinder, as shown, has a frame 11 that is supported with support members 11A relative to a floor support surface 11B. The frame includes upright members 12, and an annular ring support member 13 attached to the support members 12 and surrounding and supporting an annular outer wall 14 that forms the outer wall of the grinder. A rotating tub member 15 is placed inside the outer annular wall, and as shown the tub member 15 has a peripheral wall 16 and a outwardly tapered feed flange 17 at the top.

The tub member is supported on suitable rollers 18 mounted onto the annular member 13, and these rollers will roll along a flange 19 that extends around the rotating tub, and support the tub with respect to the frame and the outer wall 14.

The tub member as shown has a large sprocket or drive member around the periphery, and this is driven by a chain 22 which is used for rotating the tub about an upright axis. A main support floor 23 is joined to the wall 14, and as can be seen the main support floor 23 can be supported on the cross members 24 that form portions of the frame. Vertically extending support plates 25 are provided and these extend in fore and aft direction, and are attached to the cross members 24 and floor 23. A hammermill type grinding cylinder indicated generally at 26 is positioned between the side plates 25,25 at the front of the grinder. A storage hopper is formed by wall 14 and floor 23.

The cylinder assembly 26 has a center shaft 27 which has a plurality of axially spaced radially extending plates 28 drivably attached thereon. Hammer shafts 29 are mounted on the plates near the periphery thereof, and extend parallel to the shaft 27. Suitable swinging hammer members 30 are mounted on the shafts and when the cylinder shaft 27 is rotating the hammers will swing radially outwardly as shown in both FIGS. 3 and 4. Centrifugal force will cause the hammers to extend radially outwardly.

The grinder in the present device is used for grinding waste paper, as previously stated, and such waste paper is illustrated generally at 31 (FIGS. 3 and 4), and is supported on the floor 23. The paper is moved around the interior of the hopper by rotation of the tub 15, in the same manner that forage is moved by such a tub. As the waste paper is moved across the top of the cylinder, which is near the front of the grinder, it can be seen that the hammers 30 will extend through cylinder opening 47 above the surface of the floor 23, so that they will engage the waste paper 31 and grind it. The cylinder action will comminute the waste paper to a size to pass through a conventional, suitable size screen 32 that is mounted in a track 32A at each end of the screen in a conventional manner. The screen is merely shown schematically for purposes of illustration.

The ground material which passes through the screen will move into auger conveyors indicated generally at 33, which are used for discharging the ground material in any desired location for further processing.

Figure 2:
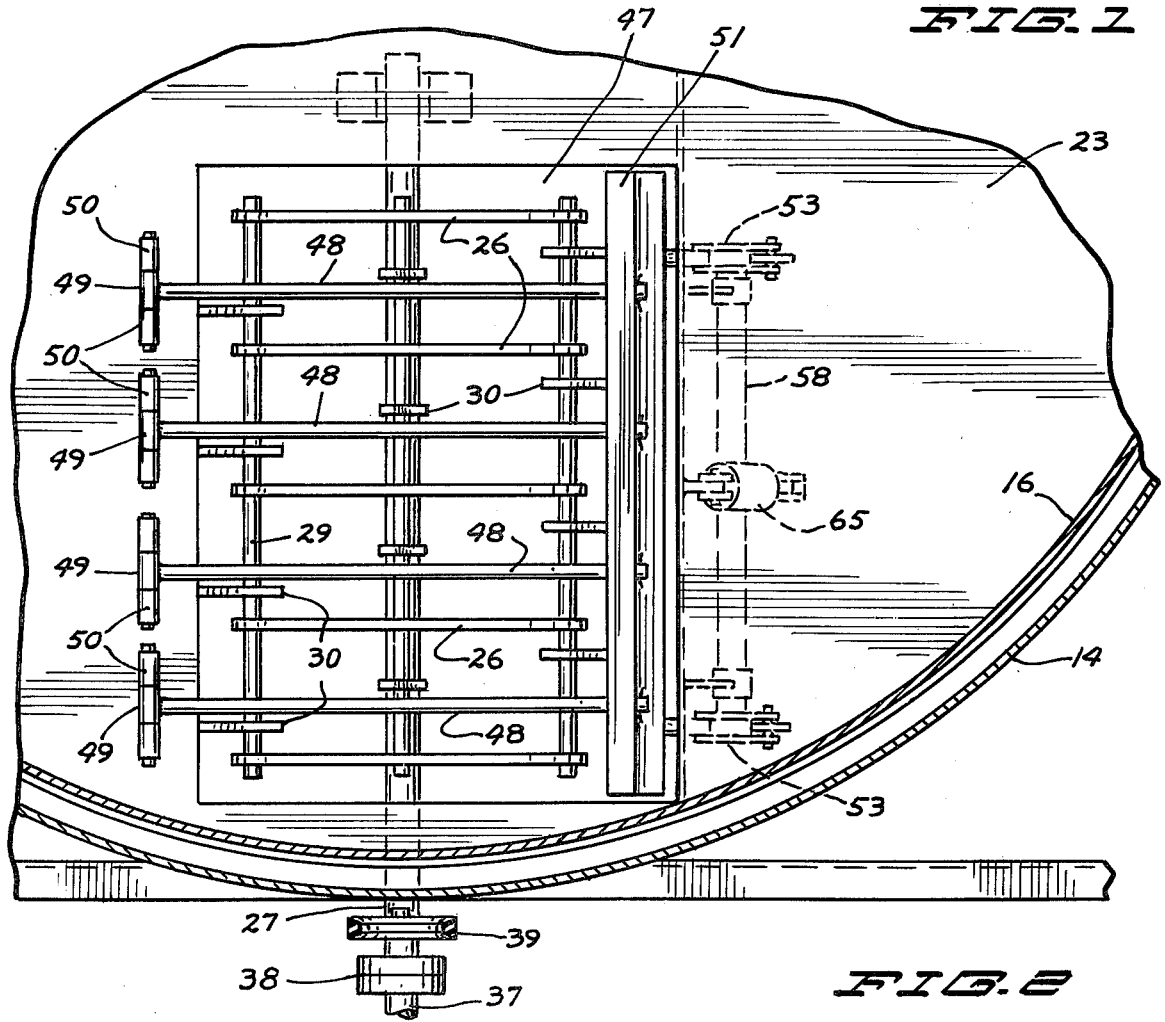
FIG. 2 is a fragmentary top plan view of the cylinder portion of the grinder of FIG. 1.

In the form of the invention shown, a large electric motor, for example a motor in the range of 150 horsepower indicated generally at 35 is utilized as a power source. This is mounted onto a motor stand 36 supported on the frame 11, and the motor has an output shaft 37 that aligns with the cylinder shaft 27. The cylinder shaft 27 is coupled to the motor shaft 37 as shown in FIG. 2 through the use of a suitable flexible coupling 38 that will take some misalignment, and will transmit the required horsepower. Such couplings are commercially available.

The shaft 27 further drives a drive member 39 such as a V belt or chain drive to drive a hydraulic pump 40 which is supported on a suitable support 41 on the frame, and which as will be explained is used to drive various components and to control operation of the device. The auger 33 and can be driven by a hydraulic motor if desired.

A hydraulic motor 42 is utilized to drive the chain 22, as shown schematically, and the hydraulic motor can be a suitable high torque hydraulic motor such as the Orbit motors sold by the CharLynn Division of Eaton Corporation, Eden Prairie, Minn. The hydraulic motor is controlled in a suitable manner as will be further explained.

As stated previously, the present device has been modified to insure that the cylinder does not become overloaded. In order to lift the paper 31 from the cylinder, the feed control mechanism indicated generally at 45 has been utilized. This mechanism comprises a cage or grate assembly 46 that is positioned over and spans across the opening 47 in the floor 23 for the cylinder. The grate assembly as shown comprises a plurality of individual grate rods 48, each of which has a T-shaped end indicated at 49 and which end is pivotally mounted in a pair of bushings 50,50. The individual grate rods are pivoted in separate pairs of bushings 50, as shown in FIG. 2, and extend or span across the cylinder openings, and are mounted into a common longitudinally extending side frame 51. The rods 48 are supported in the frame 51 in a manner so that they are slightly loose and can pivot slightly with respect to the frame 51 to avoid binding when the frame 51 is moved. The frame 51 is rigidly connected at its lower edge to a pair of control rods 52 that are slidably mounted in suitable guides 53. The guides 53 are spaced longitudinally along the length of the cylinder and are fixedly attached to the adjacent side wall 25, as shown also in FIG. 2 in dotted lines, and in FIGS. 3 and 4. The rods 52 extend to the outside of the grinder as shown. The position of the rods 52, and thus the frame 51 and attached ends of the grate rods 48 is controlled through the use of a position control assembly 57.

The position control assembly 57 includes a pivoting rock shaft 58 that is mounted in suitable bearing supports 58A with respect to the frame 11, for rotational movement. Rock shaft 58 has a pair of arms 59, one at each of the opposite ends thereof, each of which arms is pivotally connected as at 60 to a separate link 61 that in turn is pivotally connected as at 62 at its opposite end to the end of the respective control rod 52.

The rotational position of the rock shaft is controlled through the use of a hydraulic cylinder 65 which is attached as at 66 to a suitable member fixed to one side wall 25, and which has an extendable and retractable rod 67 that is connected to a rock shaft control arm 68 that in turn is fixed to the rock shaft 58. As the rod 67 of cylinder 65 extends and retracts, the rock shaft 58 will be rotated and as the rock shaft is rotated, the arms 59 will move, causing the links 61 to move the rods 52 longitudinally along the guides 53, and thus to raise and lower the upper edge of the frame 51 relative to the floor 23 and the grinding cylinder 26. This will move the grate rods 48 relative to the cylinder as the rods pivot about their end portions 49 in the supports 50. These grate rods 48 are sufficiently closely spaced so that they will lift the paper 31 which is in engagement with the hammers 30 of the cylinder to a position where the paper clears the hammers of the grinding cylinder 26. Lifting the paper away from the cylinder will relieve the load on the grinding cylinder and permit the electric motor 35 to come back up to speed after it has been overloaded. The rods 48 may be lifted to hold the paper away from the grinding cylinder hammers when the grinder is initially started up.

While the controls for the hydraulic cylinder 65 and the hydraulic motor 42 are shown only schematically, one of the features of the device is that a current sensor is placed in the circuit for the electric motor 35, so that when the current to the motor exceeds at a certain level the sensor will detect this and the hydraulic cylinder 65 as well as the hydraulic motor 42 can respond to such sensing.

It should be noted that in the previous tub type forage harvesters, which were mounted in fixed installations and wherein an electric motor was used for driving the cylinder, a suitable current sensor was utilized for controlling the drive to the rotating tub, in the same manner that is shown here. Therefore it is acknowledged prior art that the drive to the tub would be interrupted when the motor driving the grinding cylinder was loaded beyond a certain point. This is also disclosed schematically herein, and also when the current to the motor 35 reaches a second higher level the cylinder 65 is operated to retract the rod 67 automatically and lift the grate bars 48 upwardly so that the paper is lifted from the cylinder and the cylinder and motor can regain normal speed, without stopping or stalling.

As shown schematically, in FIG. 1 an instantaneous current trip relay 71 is used in the motor circuit. The current trip relays shown herein are standard units made by Allen Bradley Company, their Catalog No. 809, A23E, and the sensors can be adjusted so that when the current to the motor 35 exceeds a certain level a contact in the sensor, that is built in, will open. This contact will reset when the current drops to between 70% to 85% of its trip setting to provide automatic return or restart. The schematic showing, a solenoid valve 72 is utilized for controlling flow of hydraulic fluid from pump 40 to the hydraulic motor 42. A manual switch 73 can be utilized for controlling a solenoid valve. The valve may be a normally closed valve made by the Fluid Power Systems Division of Ambac Industries, Wheeling, Ill., their Model 3-C38-4-440-AC. The pump circuit can have a suitable pressure by-pass relief valve is desired. When the switch 73 is closed the solenoid valve 72 would be energized directing fluid to motor 42 and powering the tub. The circuit shown schematically for the switch 73 passes to the interior relay contacts of the trip 71, so that when the current being provided to electric motor 35 is below a certain level the solenoid valve will be energized, and motor 42 will be rotated. The relay 71, however, is set to trip or open the contacts when the current sensed is above a desired level, thereby disabling the circuit to the solenoid valve 72, causing the solenoid valve to shut off the flow of fluid from the pump 40 to the motor 42. This is known prior art.

Control of the cylinder 65 is basically in the same manner. An instantaneous current trip relay 70 is used to sense current, as before, but the hydraulic circuit includes a selector valve 80 that is set to receive fluid under pressure from the pump 40, and direct the fluid under pressure either to the manual valve 81, or to a solenoid valve 82. The selector valve also can control connections for return flow, which connections are not shown. For manual operation, the solenoid valve would not be energized, and the selector valve would be selected to direct fluid to and from a four way valve 81 which would permit controlling the cylinder 65 to extend and retract and manually lift and lower the grate assembly 46, to hold the paper above the periphery of the grinding cylinder such as during initial start-up and the like. Usually this will be lifted off before the unit is shut down, so that the grate will be in its raised position at shut down time, and this also could be interlocked into an automatic control if desired.

The solenoid valve 82 can be provided with fluid under pressure when the selector valve 80 is in its proper position to direct fluid under pressure to the valve and return flow from the valve to the hydraulic reservoir. The solenoid valve in this form of the invention would be a four way valve which, when energized would be directing the fluid under pressure from selector valve 80 to the hydraulic cylinder 65 so as to extend the rod, and thus keep the grate lowered, and when deenergized (normal position) would be in a position to direct the fluid under pressure to the rod end of the cylinder 65 and retract the rod to lift the grate assembly 46 up away from the cylinder and lift the paper 31 out of engagement with the cylinder. A suitable manual switch 85 can be used in the circuit for solenoid valve 82 and this is shown schematically in combination with the trip relay 70, and the contacts in the relay. This relay or sensor 70 is the same model as relay or sensor 71, but is set to open the relay contacts that are provided when the current is at a higher level than the opening of the contacts of sensor 71. Thus, when the current to the motor 35 does reach a certain level (indicating the cylinder 26 is loading down) the contacts in the sensor 70 would open, disabling the solenoid valve 82 (for automatic operation) causing the hydraulic cylinder 65 to retract, rotating the rock shaft 58, and lifting the feed control grate upwardly to lift the paper away from the grinding cylinder.

A two stage control of feed of paper is provided under load. The sensor 71 will first operate to open the circuit to solenoid valve 72, shutting off the motor 42 to stop the rotating tub from rotating, which slows the feed of paper into the cylinder, and then if load continues to increase in the motor 35 and the current rises, the sensor 70 will operate to disable the circuit to solenoid valve 82 causing the cylinder 65 to retract and lift the grate above the top of the tips of the cylinder hammers so that the paper being ground is lifted away from the cylinder to unload the cylinder.

It should be noted that the load on cylinder 26 can be sensed in a wide variety of ways. Strain gages can be used for determining power being transmitted by the cylinder shaft and the signal used for operating valves or controls for lifting the grate assembly. Also, if an internal combustion engine is being used in place of electric motor 35, the power delivered can be sensed by known sensors on the engine.

What is claimed is:

1. In a tub type grinder having a frame, a storage hopper having a grinding opening, a swinging hammer grinding cylinder mounted on said frame and positioned so the swinging hammers protrude through said grinding opening during operative grinding rotation of said grinding cylinder, a rotating tub member for moving material in the storage hopper across said opening, the improvement comprising grinding control means including a slatted grate member pivotally mounted adjacent one side of and overlying substantially the entire grinding opening and being movable from a first position wherein said grate member does not substantially affect the contact of material in said storage hopper with the hammers of said grinding cylinder, to a second position wherein material in said storage hopper and overlying said grinding opening is lifted by said grate member to be substantially out of engagement with said grinding cylinder, power means to control pivoting movement of said grate, and sensor means to sense the power utilized to rotate said cylinder, and control means to connect said sensor means and said power means to cause said power means to pivot said grate member to said second position when the power required by said grinding cylinder exceeds a desired level.

2. The combination of claim 1 wherein said power means comprises a fluid pressure cylinder and said control means comprises a fluid pressure valve controlled by said sensor means.

3. A grinder for paper or the like comprising a rotating grinding cylinder, means to drive the grinding cylinder, means to feed paper or the like to be ground to a position engaging said grinding cylinder to provide for grinding of said paper, a grate member overlying portions of said grinding cylinder and generally spanning the region where paper to be ground normally engages the grinding cylinder, and means to mount said grate member relative to said grinding cylinder including power operated means to control movement of said grate member from a first working position wherein paper moving across said grate member engages said cylinder and is ground, to a second position wherein said grate member is lifted and in turn lifts paper on the grate member out of substantial engagement with said grinding cylinder, and control means sensitive to a function of the power utilized by the means to drive said grinding cylinder to control said power means to move said grate member toward its second position when the power transmitted to the grinding cylinder exceeds a desired level.

4. The combination of claim 3 wherein said grinder includes control means for said means to feed operable to disable the means to feed when the power utilized by said means to drive said grinding cylinder is at a preselected level lower than the power utilized by the means to drive when the grate member is moved by the power means to its second position.

5. In a tub grinder machine having a frame, a material receiving tub mounted on said frame and a hammermill grinding mechanism mounted below said tub, said tub including a bottom wall stationarily mounted on said frame, with an opening formed therein, and a generally upright cylindrical side wall bounding the periphery of said bottom wall and being mounted for rotation about a generally vertical axis relative to said bottom wall, said hammermill mechanism being mounted below said bottom wall opening and including a rotatable shaft and a plurality of radially extending, axially spaced hammer elements operatively mounted thereon which move in generally circular paths projecting upwardly through said opening upon rotation of said shaft so as to engage and grind material being moved about said bottom wall and delivered to said opening therein as said side wall of said tub is rotated, said machine also having drive means operable to effect rotation of said side wall and of said hammermill shaft, the improvement which comprises:

a material metering mechanism for regulating the flow of material through said bottom wall opening, said mechanism including a frame overlying said opening and mounted to said bottom wall along one side of said opening for pivotal movement toward and away from said opening, said frame defining one or more passageways which extend in transverse relationship to said hammermill shaft and through which said hammer elements extend to engage material delivered to said opening over said frame, and means operable for effecting pivotal displacement of said frame toward and away from said opening to vary the amount of material delivered to said opening which may be engaged by said hammer elements at any one time, said operable means including means responsive to the speed of rotation of said hammermill shaft to cause displacement of said frame away from said opening when the speed of rotation of said shaft decreases due to the occurrence of a material overload condition in said hammermill mechanism.

6. A tub grinder machine as recited in claim 5, wherein said frame is substantially coextensive in size with said opening.

* * * * *